United States Patent [19]
Slee

[11] Patent Number: 5,125,551
[45] Date of Patent: Jun. 30, 1992

[54] CYLINDER HEAD GASKET

[75] Inventor: Roger H. Slee, Warwick, United Kingdom

[73] Assignee: T&N Technology Limited, Great Britain

[21] Appl. No.: 244,497

[22] Filed: Sep. 15, 1988

[30] Foreign Application Priority Data

Sep. 17, 1987 [GB] United Kingdom ............... 8721840

[51] Int. Cl.⁵ .............................................. F16J 15/12
[52] U.S. Cl. ...................................... 277/22; 277/235 B
[58] Field of Search ........................... 277/235 B, 22; 123/41.74, 41.82 R

[56] References Cited

U.S. PATENT DOCUMENTS

| | | | |
|---|---|---|---|
| 1,241,587 | 10/1917 | Victor | 277/235 B X |
| 1,814,283 | 7/1931 | Braner | 277/235 B |
| 3,430,611 | 3/1969 | Belter | 123/41.82 |
| 4,049,856 | 9/1977 | Adams | 428/131 |
| 4,272,085 | 6/1981 | Fujikawa et al. | 277/235 B |

*Primary Examiner*—Allan N. Shoap
*Assistant Examiner*—Scott W. Cummings
*Attorney, Agent, or Firm*—Nixon & Vanderhye

[57] ABSTRACT

Cylinder head gasket which includes between adjacent cylinder bore apertures a heat-conductive element which is in thermal contact with the metal eyelets of those apertures and extends into a coolant aperture of the gasket.

Such a gasket is less liable to failure through non-uniform heating during engine operation.

5 Claims, 1 Drawing Sheet

CYLINDER HEAD GASKET

This invention relates to cylinder head gaskets for internal combustion engines.

The cylinder bore apertures of such gaskets are often reinforced with eyelets of wire gauze, copper, stainless steel, nickel base alloy or other metal. When the engine is running the cylinder block does not get uniformly hot. Hence the gasket eyelets, since they have their edges in contact with hot cylinder gases, get appreciably hotter than the adjacent areas between the cylinder bore apertures. The resulting thermal gradients can set up strains which may cause failure of the gasket, particularly in those gaskets designed for close-set cylinders (so-called 'siamesed bores'). Additionally, some distortion of the metal eyelet may occur, leading to leakage of combustion gases.

The present invention is concerned with achieving a more even distribution of temperature in a cylinder head gasket during engine operation.

According to the invention we provide between adjacent cylinder bore apertures of a cylinder head gasket a heat-conductive element which is in thermal contact with the metal eyelets of those apertures and extends into a coolant aperture of the gasket.

The heat-conductive element is suitably of metal strip, particularly copper or aluminium strip.

Where the gasket is a laminate, the element may be enclosed between adjacent laminae in it.

Figure 1:
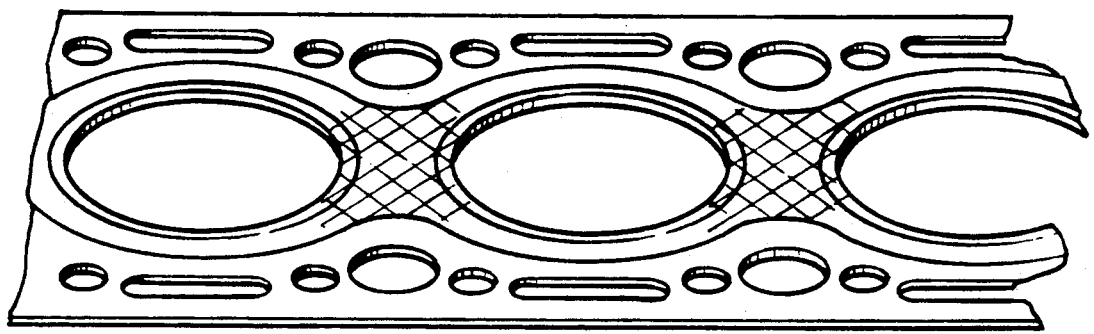
Figure 2:
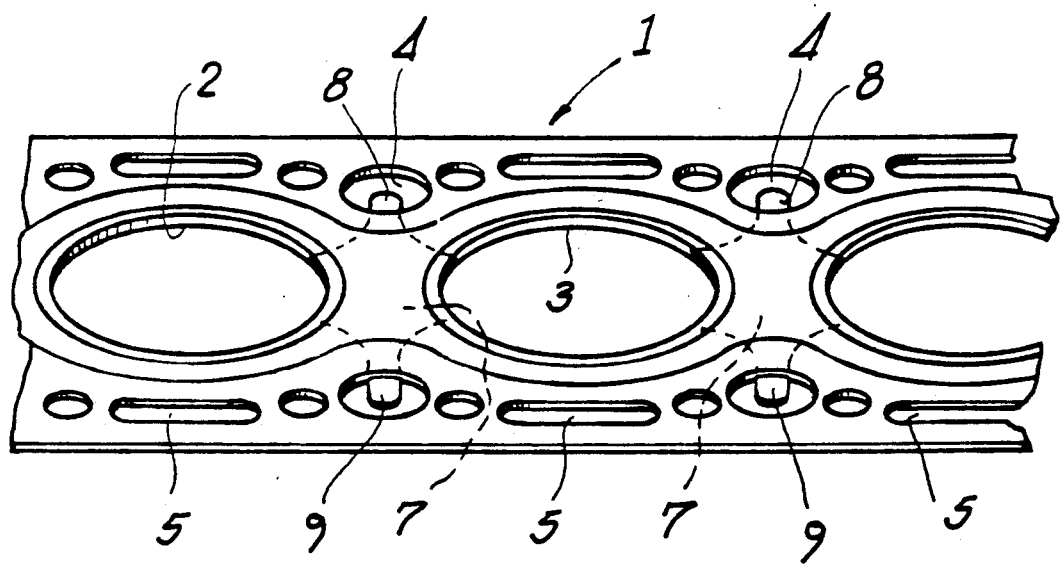

The invention is further illustrated with reference to the accompanying drawings, in which:

FIG. 1 is a view in perspective of part of a common form of cylinder head gasket, in which the diagonal hatching indicates areas at risk through non-uniform heating during engine operation; and FIG. 2 is a view in perspective of a gasket according to the invention.

In the drawings a gasket 1 which is a laminate of compressed paper has cylinder bore apertures protected by metal eyelets 2 and 3, and has other apertures of which 4 and 5 are for coolant.

Between adjacent cylinder bore apertures and within the laminate construction there is a strip of copper 7, in thermal contact with the eyelets 2 and 3. The strip has fingers 8 and 9 which protrude into coolant apertures 4.

During engine operation, excess heat generated in the eyelets 2 and 3 is conducted rapidly via element 7 into the coolant passages of the engine corresponding to apertures 4 in the gasket.

I claim:

1. A cylinder head gasket having a plurality of cylinder bore apertures, and at least one cooling aperture, each of said cylinder bore apertures reinforced with a metal eyelet, said gasket including between adjacent cylinder bore apertures a heat-conductive element which is in thermal contact with the metal eyelet of said adjacent cylinder bore apertures, and which extends into said at least one coolant aperture of the gasket.

2. The gasket according to claim 1, in which the heat-conductive element comprises metal strip.

3. The gasket according to claim 2, in which the element is copper or aluminium strip.

4. The gasket according to claim 1, wherein the gasket is of laminar construction, in which the heat-conductive element is enclosed between adjacent laminae.

5. The gasket according to claim 4, in which the laminae are compressed paper.

* * * * *